United States Patent
Li et al.

(10) Patent No.: US 12,337,268 B2
(45) Date of Patent: Jun. 24, 2025

(54) XYLOSE HYDROLYSATE DECOLORIZATION AND FILTRATION DEVICE AND DECOLORIZATION AND FILTRATION METHOD USING SAME

(71) Applicants: Zhejiang Huakang Pharmaceutical Co., Ltd., Zhejiang (CN); JIAOZUO HUAKANG POLYOL CO., LTD., Henan (CN)

(72) Inventors: Zhe Li, Zhejiang (CN); Xuesong Jiang, Zhejiang (CN); Qiang Ma, Zhejiang (CN); Xiaoyang Zheng, Zhejiang (CN); Yongjun Wang, Zhejiang (CN); Weimin Fu, Zhejiang (CN); Xiaojun Chu, Zhejiang (CN)

(73) Assignees: Zhejiang Huakang Pharmaceutical Co., Ltd., Quzhou (CN); JIAOZUO HUAKANG POLYOL CO., LTD., Jiaozuo (CN)

( * ) Notice: Subject to any disclaimer, the term of this patent is extended or adjusted under 35 U.S.C. 154(b) by 815 days.

(21) Appl. No.: 17/456,256

(22) Filed: Nov. 23, 2021

(65) Prior Publication Data
US 2022/0080339 A1 Mar. 17, 2022

Related U.S. Application Data

(63) Continuation of application No. PCT/CN2020/117963, filed on Sep. 26, 2020.

(30) Foreign Application Priority Data

Dec. 19, 2019 (CN) .......................... 201911316163.X

(51) Int. Cl.
*B01D 36/00* (2006.01)
*C13K 13/00* (2006.01)

(52) U.S. Cl.
CPC .......... *B01D 36/00* (2013.01); *B01D 2101/02* (2013.01); *B01D 2257/70* (2013.01); *C13K 13/002* (2013.01)

(58) Field of Classification Search
CPC ..... B01D 36/00; B01D 36/003; C13K 13/002
(Continued)

(56) References Cited

U.S. PATENT DOCUMENTS 1,808,755 A * 6/1931 Baylis ..................... C11B 11/00
554/188

FOREIGN PATENT DOCUMENTS

CN 101381383 3/2009
CN 101381383 A 3/2009
(Continued)

OTHER PUBLICATIONS

Machine Translation of CN 105396324 A (Year: 2016).*
(Continued)

*Primary Examiner* — Lessanework Seifu
(74) *Attorney, Agent, or Firm* — Fish & Richardson P.C.

(57) ABSTRACT

The present invention discloses a xylose hydrolysate decolorization and filtration device. A hydrolysate is filtered through a to-be-cleaned filtering machine to form a waste carbon liquid with a light transmittance of 7% to 10%, the waste carbon liquid is subjected to pressure filtration through a filter press to form a plate and frame liquid, the plate and frame liquid is filtered through a to-be-passed-through filtering machine to form a pre-decolorized liquid with a light transmittance of 30% to 35%, the pre-decolorized liquid enters a decolorization tank and is mixed with added new carbon in the decolorization tank to form a new carbon liquid, and the new carbon liquid is filtered through a standby filtering machine to form a decolorized liquid with a light transmittance of greater than 65%. The present (Continued)

invention further discloses a xylose hydrolysate decolorization and filtration method using the device. According to the present invention, the pollution of carbon powder to the surrounding environment is effectively reduced, the xylose hydrolysate is effectively decolorized and filtered, the device is designed in a compact way and takes up less space, and the entire decolorization and filtration process is carried out in a sealed environment, which reduces the pollution to the surrounding environment.

6 Claims, 2 Drawing Sheets

(58) Field of Classification Search
USPC .................................................... 127/24, 55
See application file for complete search history.

(56) References Cited

FOREIGN PATENT DOCUMENTS

| | | | |
|---|---|---|---|
| CN | 101659681 | | 3/2010 |
| CN | 202226866 | | 5/2012 |
| CN | 102676296 A | | 9/2012 |
| CN | 103007624 | | 4/2013 |
| CN | 103113424 | | 5/2013 |
| CN | 203451538 U | | 2/2014 |
| CN | 103958421 | | 7/2014 |
| CN | 203678115 U | | 7/2014 |
| CN | 105396324 A | * | 3/2016 |
| CN | 205586669 U | | 9/2016 |
| CN | 2017221151 A | | 12/2017 |
| CN | 108384900 A | | 8/2018 |
| CN | 108611186 A | | 10/2018 |
| CN | 209270993 | | 8/2019 |
| CN | 110841367 | | 2/2020 |
| CN | 211462363 U | | 9/2020 |
| DE | 102004028832 A1 | | 9/2005 |
| WO | WO 2006084065 | | 8/2006 |

OTHER PUBLICATIONS

International Search Report in International Appln. No. PCT/CN2020/117963, dated Dec. 30, 2020, 3 pages.

Extended European Search Report in European Appln No. 20901900.9, dated Mar. 14, 2022, 8 pages.

* cited by examiner ial Application No. PCT/CN2020/117963, filed Sep. 26, 2020, which claims priority from Chinese Application No. 201911316163.X, filed Dec. 19, 2019. The entire contents of the prior applications are incorporated herein by reference in their entirety.

TECHNICAL FIELD

The present invention belongs to the technical field of xylose decolorization, and particularly relates to a xylose hydrolysate decolorization and filtration device and a decolorization and filtration method using the same.

BACKGROUND

In xylose production industry, corn cob is a major raw material for production of xylose. Since corn cob contains abundant natural pigments which will seriously affect the appearance of the finished xylose, it is necessary to decolorize a hydrolysate after hydrolysis. In the conventional decolorization process, the utilization rate of activated carbon is low, and the decolorization of the hydrolysate is not complete. The patent publication number CN202226866U discloses a xylose hydrolysate decolorization system device, by which the original primary decolorization device is changed into a tertiary decolorization device, which solves the problems of high load of ion exchange resin, short service life of ion exchange resin, high consumption of raw and auxiliary materials, but brings high production cost of xylose. However, three floors are required for placement of this set of equipment, thereby occupying a large space and requiring assistance of many people. In addition, the system uses three plate and frame filter presses, and the splash of dry carbon when removing the filter cake will pollute the surrounding environment.

SUMMARY

The technical problem to be solved by the present invention is to provide a xylose hydrolysate decolorization and filtration device and a decolorization and filtration method using the same to increase the utilization rate of activated carbon and improve the problem of incomplete decolorization of the hydrolysate. Moreover, the device is designed in a compact way and takes up less space, and intermediate processes are all carried out in sealed device pipes, which reduce the pollution to the surrounding environment.

The present invention is realized by providing a xylose hydrolysate decolorization and filtration device, including a decolorization tank, a filtering unit, a filter press and a storage tank, where the filtering unit includes at least three filtering machines connected in parallel, the at least three filtering machines respectively perform a reciprocating cycle among three working states of standby, to be passed through and to be cleaned, at least one of the filtering machines is a to-be-cleaned filtering machine in a to-be-cleaned state, at least one of the filtering machines is a to-be-passed-through filtering machine in a to-be-passed-through state, and at least one of the filtering machines is a standby filtering machine in a standby state, the to-be-cleaned filtering machine contains waste carbon that has been used twice, the to-be-passed-through filtering machine contains old carbon that has been used once, and the to-be-cleaned filtering machine is cleaned to become the standby filtering machine after being used for filtration once again; and the to-be-cleaned filtering machine filters an incoming xylose hydrolysate to obtain a waste carbon liquid, the filter press (3) performs pressure filtration on the incoming waste carbon liquid to form a plate and frame liquid, the to-be-passed-through filtering machine filters the incoming plate and frame liquid to form a pre-decolorized liquid, the pre-decolorized liquid enters the decolorization tank and is mixed with new carbon added in the decolorization tank to form a new carbon liquid, the standby filtering machine filters the incoming new carbon liquid to form a decolorized liquid, and the storage tank temporarily stores the decolorized liquid.

Further, the to-be-cleaned filtering machine, the to-be-passed-through filtering machine and the standby filtering machine are respectively provided with a hydrolysate pipe, a new carbon liquid pipe, a plate and frame liquid pipe, a pre-decolorized liquid pipe, a decolorized liquid pipe and a waste carbon liquid pipe, the hydrolysate pipe is provided with a hydrolysate valve, the new carbon liquid pipe is provided with a new carbon liquid valve, the plate and frame liquid pipe is provided with a plate and frame liquid valve, the pre-decolorized liquid pipe is provided with a pre-decolorized liquid valve, the decolorized liquid pipe is provided with a decolorized liquid valve, and the waste carbon liquid pipe is provided with a waste carbon liquid valve.

Further, the waste carbon liquid pipe is further provided with a first pump body in communication with an inlet of the filter press.

Further, the plate and frame liquid pipe is further provided with a second pump body in communication with an outlet of the filter press.

Further, the new carbon liquid pipe is further provided with a third pump body in communication with an outlet of the decolorization tank.

Further, the pre-decolorized liquid pipe is further provided with a fourth pump body in communication with an inlet of the decolorization tank.

Further, the decolorization tank is provided with a stirrer.

The present invention is realized by providing a xylose hydrolysate decolorization and filtration method using the xylose hydrolysate decolorization and filtration device as described above, including the following steps:

step I, opening a valve to enable a xylose hydrolysate to enter the to-be-cleaned filtering machine from the hydrolysate pipe and then enter the waste carbon liquid pipe while carrying the waste carbon in the to-be-cleaned filtering machine through the waste carbon liquid valve, such that the hydrolysate is decolorized and filtered to become a waste carbon liquid with a light transmittance increased from 0 to 7%-10%, wherein the to-be-cleaned filtering machine is cleaned to change the state of the to-be-cleaned filtering machine from to be cleaned to standby;

step II, transporting the waste carbon liquid in the waste carbon liquid pipe into the filter press for pressure filtration, wherein a clear liquid produced by the pressure filtration is a plate and frame liquid;

step III, opening the plate and frame liquid valve to transport the plate and frame liquid in the plate and frame liquid pipe into the to-be-passed-through filtering machine, and enable the plate and frame liquid to pass through an old carbon filter cake in the to-be-passed-through filtering machine and then enter the pre-decolorized liquid pipe through the pre-decolorized liquid valve, such that the plate and frame liquid is decolorized and filtered to become a pre-decolorized liquid with a light transmittance increased from 7%-10% to 30%-35%, and the state of the to-be-passed-through filtering machine is changed from to be passed through to to be cleaned;

step IV, transporting the pre-decolorized liquid in the pre-decolorized liquid pipe into the decolorized tank, adding new carbon to perform stirring for some time, and then enabling the mixture to enter the new carbon liquid pipe, wherein the pre-decolorized liquid and the added new carbon are mixed into a new carbon liquid;

step V, opening the new carbon liquid valve to enable the new carbon liquid to enter the standby filtering machine from the new carbon liquid pipe to produce, through filtering, a clear liquid with a light transmittance being ≥65%, transporting the filtered clear liquid into the decolorized liquid pipe through the decolorized liquid valve, wherein a filtered new carbon liquid becomes a decolorized liquid, and a state of the standby filtering machine is changed from standby to to be passed through; and step VI, finally, collecting the decolorized liquid in the decolorized liquid pipe into a storage tank to complete the entire hydrolysate decolorization and filtration process.

Compared with the prior art, in the xylose hydrolysate decolorization and filtration device and the decolorization and filtration method using the same according to the present invention, the hydrolysate is filtered through the to-be-cleaned filtering machine to form the waste carbon liquid with a light transmittance of 7% to 10%, the waste carbon liquid discharged from the to-be-cleaned filtering machine is press-filtered through the filter press to form the plate and frame liquid, the plate and frame liquid discharged from the filter press is filtered through the to-be-passed-through filtering machine to form the pre-decolorized liquid with a light transmittance of 30% to 35%, the pre-decolorized liquid discharged from the to-be-passed-through filtering machine enters the decolorization tank and is mixed with the newly-added new carbon in the decolorization tank to form the new carbon liquid, the new carbon liquid discharged from the decolorization tank is filtered through the standby filtering machine to form the decolorized liquid with a light transmittance of greater than 65%, and the decolorized liquid is temporarily stored in the storage tank. The filter press disposed in the present invention effectively reduces the pollution of carbon powder to the surrounding environment, and the to-be-cleaned filtering machine, the to-be-passed-through filtering machine and the standby filtering machine disposed can effectively decolorize and filter the xylose hydrolysate. The device is designed in a compact way and takes up less space, and the entire decolorization and filtration process is carried out in a sealed environment, which reduces the pollution.

DETAILED DESCRIPTION OF THE EMBODIMENTS

In order to make the technical problems to be solved, technical solutions and advantageous effects of the invention clearer, the present invention will be described in detail below with reference to the accompanying drawing and examples. It should be understood that the specific examples described herein are merely illustrative of the invention and are not intended to limit the invention.

Figure 1:
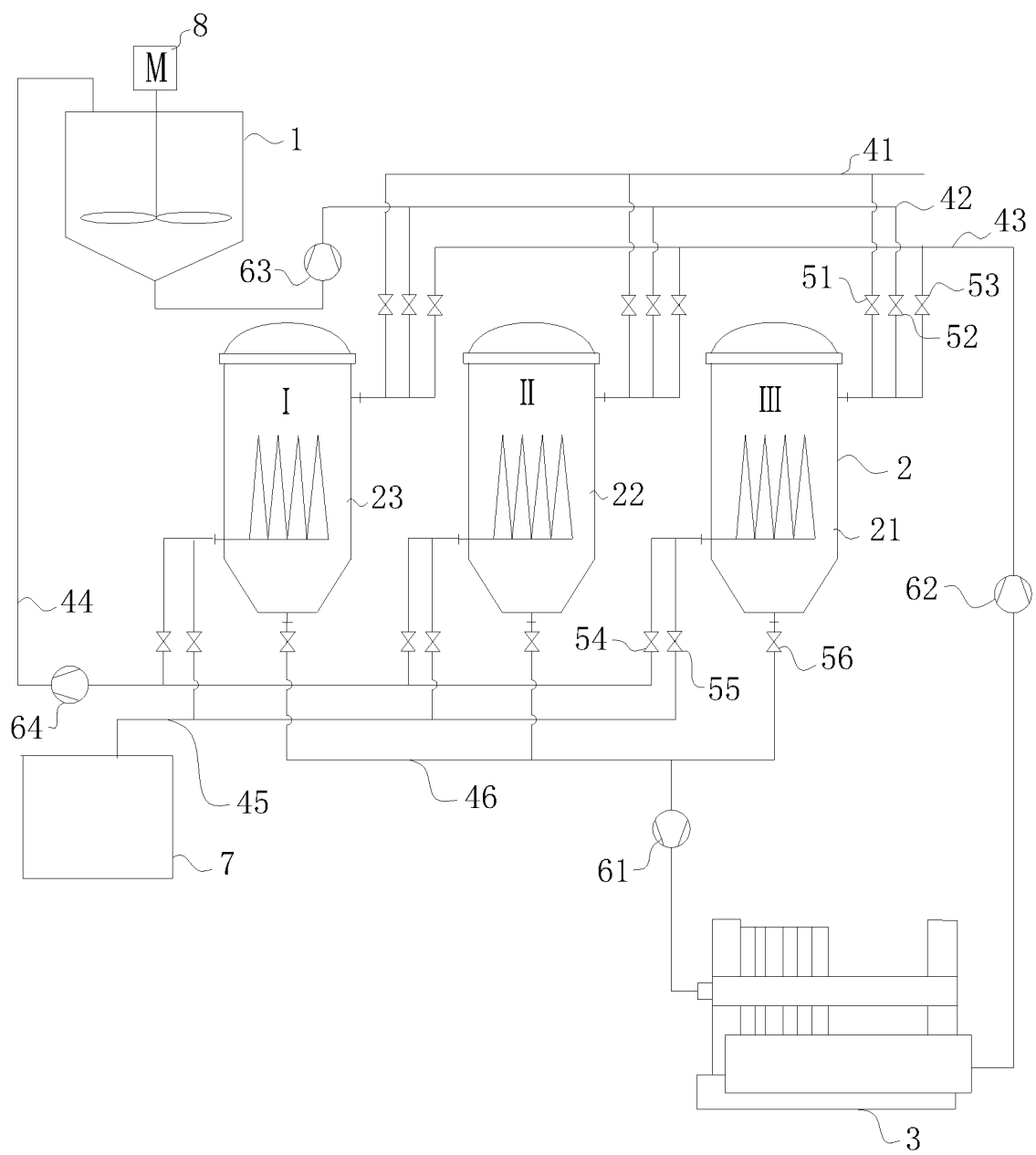
FIG. 1 is a schematic structural principle plan view of a xylose hydrolysate decolorization and filtration device according to a preferred example of the present invention.
Figure 2:
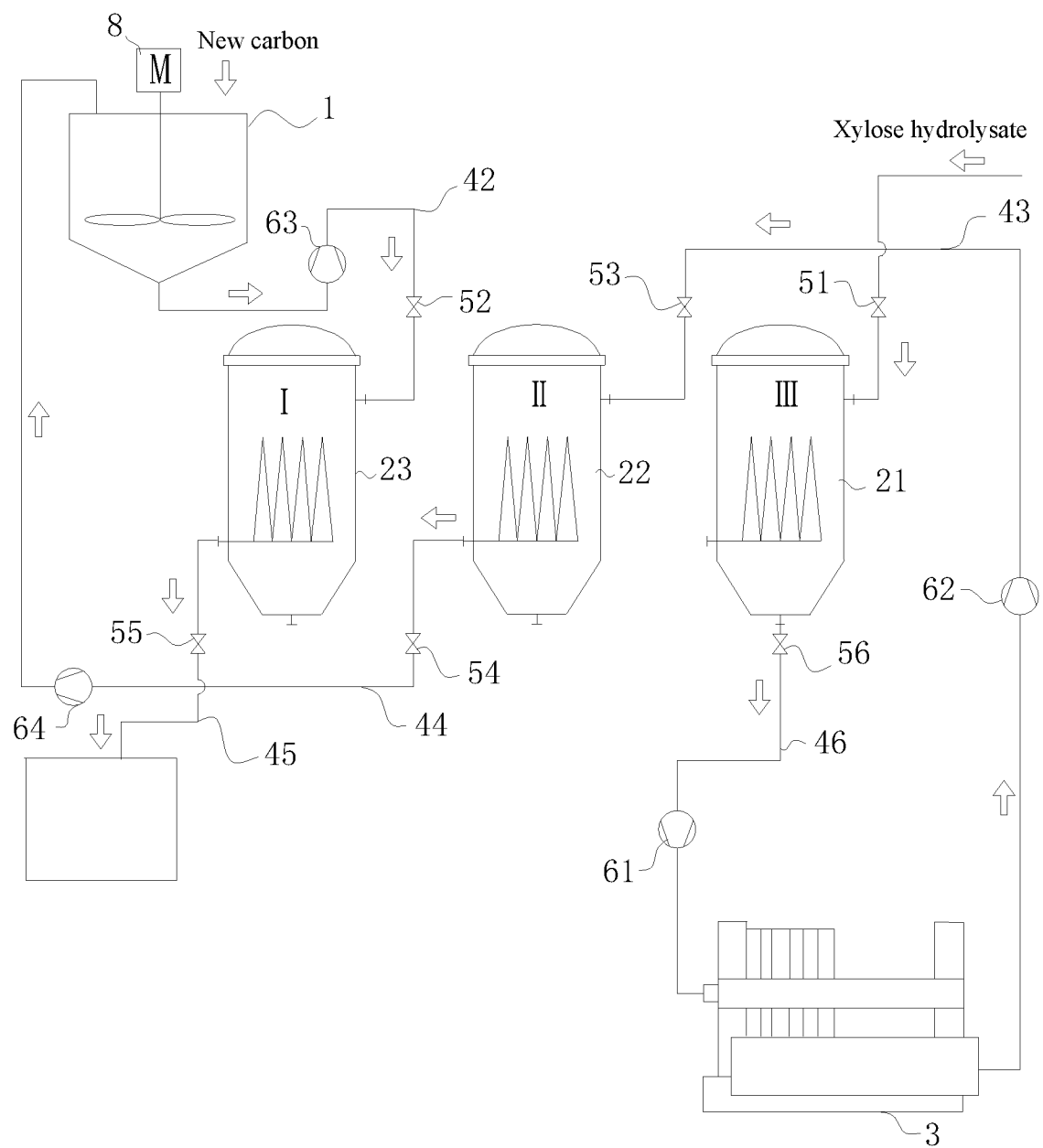
FIG. 2 is a schematic working principle diagram of FIG. 1.

Referring to FIG. 1 and FIG. 2 at the same time, in a preferred example of a xylose hydrolysate decolorization and filtration device according to the present invention a xylose hydrolysate decolorization and filtration device includes a decolorization tank 1, a filtering unit 2, a filter press 3 and a storage tank 7.

The filtering unit 2 includes at least three filtering machines connected in parallel. The at least three filtering machines respectively perform a reciprocating cycle among three working states, i.e. standby, to be passed through and to be cleaned. At least one of the filtering machines is a to-be-cleaned filtering machine 21 in a to-be-cleaned state, at least one of the filtering machines is a to-be-passed-through filtering machine 22 in a to-be-passed-through state, and at least one of the filtering machines is a standby filtering machine 23 in a standby state. The to-be-cleaned filtering machine 21 contains waste carbon that has been used twice, the to-be-passed-through filtering machine 22 contains old carbon that has been used once, and the to-be-cleaned filtering machine 21 is cleaned to become the standby filtering machine 23 after being used for filtration once again.

An incoming xylose hydrolysate is filtered through the to-be-cleaned filtering machine 21 to obtain a waste carbon liquid, the waste carbon liquid is press-filtered through the filter press 3 to form a plate and frame liquid, the plate and frame liquid is filtered through the to-be-passed-through filtering machine 22 to form a pre-decolorized liquid, the pre-decolorized liquid enters the decolorization tank 1 and is mixed with new carbon added in the decolorization tank 1 to form a new carbon liquid, the new carbon liquid is filtered through the standby filtering machine 23 to form a decolorized liquid, and the decolorized liquid is temporarily stored in the storage tank 7.

The to-be-cleaned filtering machine 21, the to-be-passed-through filtering machine 22 and the standby filtering machine 23 are respectively provided with a hydrolysate pipe 41, a new carbon liquid pipe 42, a plate and frame liquid pipe 43, a pre-decolorized liquid pipe 44, a decolorized liquid pipe 45 and a waste carbon liquid pipe 46. The hydrolysate pipe 41 is provided with a hydrolysate valve 51, the new carbon liquid pipe 42 is provided with a new carbon liquid valve 52, the plate and frame liquid pipe 43 is provided with a plate and frame liquid valve 53, the pre-decolorized liquid pipe 44 is provided with a pre-decolorized liquid valve 54, the decolorized liquid pipe 45 is provided with a decolorized liquid valve 55, and the waste carbon liquid pipe 46 is provided with a waste carbon liquid valve 56.

By disposing and controlling the hydrolysate valve 51, the new carbon liquid valve 52, the plate and frame liquid valve 53 as well as the pre-decolorized liquid valve 54 and the waste carbon liquid valve 56, the at least three filtering machines can be switched among different working states, and rotated among the working roles of the to-be-cleaned filtering machine 21, the to-be-passed-through filtering machine 22 and the standby filtering machine 23.

The waste carbon liquid pipe 46 is further provided with a first pump body 61 in communication with an inlet of the filter press 3. The plate and frame liquid pipe 43 is further provided with a second pump body 62 in communication with an outlet of the filter press 3. The new carbon liquid pipe 42 is further provided with a third pump body 63 in communication with an outlet of the decolorized tank 1. The pre-decolorized liquid pipe 44 is further provided with a fourth pump body 64 in communication with an inlet of the decolorization tank 1.

The decolorization tank 1 is provided with a stirrer 8 to facilitate the thorough mixing of the new carbon and the liquid.

A use method of the xylose hydrolysate decolorization and filtration device of the invention will be further described below in conjunction with specific examples.

EXAMPLE 1

The present invention further discloses a xylose hydrolysate decolorization and filtration method using the xylose hydrolysate decolorization and filtration device as described above, including the following steps.

At step I, the valve 51 of the to-be-cleaned filtering machine 21 is opened to enable a xylose hydrolysate to enter the to-be-cleaned filtering machine 21 through the hydrolysate pipe 41, as shown by the arrow in FIG. 2, and then enter the waste carbon liquid pipe 46 through the waste carbon liquid valve 56 while carrying waste carbon in the to-be-cleaned filtering machine 21. In this process, the hydrolysate is subjected to primary decolorization by using the waste carbon to become a waste carbon liquid with a light transmittance increased from 0 to 7%-10%, and the to-be-cleaned filtering machine 21 is cleaned to change its state from to be cleaned to standby.

At step II, the waste carbon liquid in the waste carbon liquid pipe 46 is transported into the filter press 3 for pressure filtration. The process aims to remove the waste carbon carried by the waste carbon liquid to produce a clear liquid through press filtering, where the filtered clear liquid is a plate and frame liquid.

At step III, the plate and frame liquid valve 53 of the to be-passed-through filtering machine 22 is opened to transport the plate and frame liquid in the plate and frame liquid pipe 43 into the be-passed-through filtering machine 22, and enable the plate and frame liquid to pass through an old carbon filter cake in the be-passed-through filtering machine 22 and then enter the pre-decolorized liquid pipe 44 through the pre-decolorized liquid valve 54. In this process, the plate and frame liquid is subjected to secondary decolorization by using the old carbon filter cake to become a pre-decolorized liquid with a light transmittance increased from 7%-10% to 30%-35%, the state of the be-passed-through filtering machine 22 is changed from to be passed through to be cleaned.

At step IV, the pre-decolorized liquid in the pre-decolorized liquid pipe 44 is transported into the decolorization tank 1, new carbon is added, as shown by the arrow in FIG. 2, and the pre-decolorized liquid and the new carbon are stirred for some time, and then transported into the new carbon liquid pipe 42. In this process, the pre-decolorized liquid is subjected to tertiary decolorization by using newly-added new carbon to become a new carbon liquid.

At step V, the new carbon liquid valve 52 of the standby filtering machine 23 is opened to enable the new carbon liquid to enter the standby filtering machine 23 through the new carbon liquid pipe 42 produce a filtered clear liquid, i.e. a decolorized liquid, with a light transmittance is ≥65%, and then enter the decolorized liquid pipe 45 through the decolorized liquid valve 55. The process aims to remove the old carbon in the new carbon liquid and enable the old carbon to form a filter cake on a filter plate of the filtering machine, the filtered new carbon liquid becomes the decolorized liquid, and the state of the standby filtering machine 23 is changed from standby to to be passed through.

At step VI, finally, the decolorized liquid in the decolorized liquid pipe 45 is collected into a storage tank 7 to complete the entire hydrolysate decolorization and filtration process.

The above description is only the preferred examples of the present invention and is not intended to limit the invention. Any modifications, equivalent substitutions and improvements made within the spirit and scope of the invention should be included within the protection scope of the invention.

The invention claimed is:

1. A method of using a xylose hydrolysate decolorization and filtration device wherein the xylose hydrolysate decolorization and filtration device comprises:
   (i) a decolorization tank;
      wherein the decolorization tank is configured to receive a pre-decolorized liquid and mix the pre-decolorized liquid with new carbon added in the decolorization tank to form a new carbon liquid,
   (ii) a filtering unit;
      wherein the filtering unit comprises at least three filtering machines connected in parallel, wherein
      the at least three filtering machines respectively perform a reciprocating cycle among three working states of standby, to-be-passed-through, and to-be-cleaned; and
      at least one of the filtering machines is a standby filtering machine in a standby state, at least one of the filtering machines is a to-be-passed-through filtering machine in a to-be-passed-through state, and at least one of the filtering machines is a to-be-cleaned filtering machine in a to-be-cleaned state;
         wherein the standby filtering machine is configured to filter the new carbon liquid to form a decolorized liquid,
         wherein the to-be-passed-through filtering machine is
         (a) configured to contain carbon that passed through the decolorization tank;
         wherein the to-be-cleaned filtering machine is
         (a) configured to contain waste carbon that passed through the to-be-passed-through filtering machine;
         (b) configured to be cleaned to become the standby filtering machine; and
         (c) configured to filter an incoming xylose hydrolysate to obtain a waste carbon liquid;
      wherein the to-be-cleaned filtering machine, the to-be-passed-through filtering machine, and the standby filtering machine are respectively provided with a hydrolysate pipe, a new carbon liquid pipe, a plate and frame liquid pipe, a pre-decolorized liquid pipe, a decolorized liquid pipe, and a waste carbon liquid pipe;

wherein the hydrolysate pipe is provided with a hydrolysate valve, the new carbon liquid pipe is provided with a new carbon liquid valve, the plate and frame liquid pipe is provided with a plate and frame liquid valve, the pre-decolorized liquid pipe is provided with a pre-decolorized liquid valve, the decolorized liquid pipe is provided with a decolorized liquid valve, and the waste carbon liquid pipe is provided with a waste carbon liquid valve;

(iii) a filter press;

wherein the filter press is configured to perform pressure filtration on the waste carbon liquid to form a plate and frame liquid;

wherein the to-be-passed-through filtering machine is configured to filter the plate and frame liquid to form the pre-decolorized liquid; and (iv) a storage tank;

wherein the storage tank is configured to store the decolorized liquid wherein the method comprises the following steps:

step I, opening the hydrolysate valve to enable a xylose hydrolysate to enter the to-be-cleaned filtering machine from a hydrolysate pipe and then enter the waste carbon liquid pipe while carrying the waste carbon in the to-be-cleaned filtering machine through the waste carbon liquid valve, such that the hydrolysate is decolorized and filtered to become a waste carbon liquid with a light transmittance increased from 0 to 7%-10%, wherein the to-be-cleaned filtering machine is cleaned to change the state of the to-be-cleaned filtering machine from to be cleaned to standby;

step II, transporting the waste carbon liquid in the waste carbon liquid pipe into the filter press for pressure filtration, wherein a clear liquid produced by the pressure filtration is a plate and frame liquid;

step III, opening the plate and frame liquid valve to transport the plate and frame liquid in the plate and frame liquid pipe into the to-be-passed-through filtering machine, and enable the plate and frame liquid to pass through a carbon filter cake in the to-be-passed-through filtering machine and then enter the pre-decolorized liquid pipe through the pre-decolorized liquid valve, such that the plate and frame liquid is decolorized and filtered to become a pre-decolorized liquid with a light transmittance of the pre-decolorized liquid increased from 7%-10% to 30%-35%, and the state of the to-be-passed-through filtering machine is changed from to be passed through to be cleaned;

step IV, transporting the pre-decolorized liquid in the pre-decolorized liquid pipe into the decolorization tank, adding new carbon to perform stirring for some time, and then enabling the mixture to enter the new carbon liquid pipe, wherein the pre-decolorized liquid and the added new carbon are mixed into a new carbon liquid;

step V, opening the new carbon liquid valve to enable the new carbon liquid to enter the standby filtering machine from the new carbon liquid pipe to produce, through filtering, a clear liquid with light transmittance being $\geq 65\%$, transporting the filtered clear liquid into the decolorized liquid pipe through the decolorized liquid valve, wherein a filtered new carbon liquid becomes a decolorized liquid, and a state of the standby filtering machine is changed from standby to be passed through; and step VI, collecting the decolorized liquid in the decolorized liquid pipe into a storage tank to complete the hydrolysate decolorization and filtration process.

2. The method of claim 1, wherein the waste carbon liquid pipe is further provided with a first pump body in communication with an inlet of the filter press.

3. The method of claim 1, wherein the plate and frame liquid pipe is further provided with a second pump body in communication with an outlet of the filter press.

4. The method of claim 1, wherein the new carbon liquid pipe is further provided with a third pump body in communication with an outlet of the decolorization tank.

5. The method of claim 1, wherein the pre-decolorized liquid pipe is further provided with a fourth pump body in communication with an inlet of the decolorization tank.

6. The method of claim 1, wherein the decolorization tank is provided with a stirrer.

* * * * *